F. SHAY.
POULTRY PERCH.
APPLICATION FILED APR. 13, 1910.

984,036.

Patented Feb. 14, 1911.

WITNESSES:
Fredk H. W. Fraentzel
Anna H. Alter

INVENTOR:
Frank Shay,
BY Fraentzel and Rickards,
ATTORNEYS

UNITED STATES PATENT OFFICE.

FRANK SHAY, OF NEWARK, NEW JERSEY.

POULTRY-PERCH.

984,036.

Specification of Letters Patent.

Patented Feb. 14, 1911.

Application filed April 13, 1910. Serial No. 555,138.

*To all whom it may concern:*

Be it known that I, FRANK SHAY, a citizen of the United States, residing at Newark, in the county of Essex and State of New Jersey, have invented certain new and useful Improvements in Poultry-Perches; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in attachments for poultry perches, and the like; and, the invention has reference, more particularly, to a novel, simple and effective device adapted to be secured to the well known types of poultry perches for the purpose of disinfecting or treating the same to prevent lice or other vermin from lodging thereupon.

The invention has for its principal object to provide a disinfecting device for poultry perches which may be easily and quickly attached to a perch, and which when so attached treats the said perch by supplying thereto a disinfecting fluid which kills the lice or other vermin coming in contact with said perch, and otherwise renders the said poultry perch sanitary and healthful.

Another object of the present invention is to reduce to the simplest form of construction, compatible with effective operation, a device of the character and for the purposes above set forth, thereby rendering the same easily adapted to many styles or arrangements of poultry perches, and furthermore, supplying a cheap and easily applied disinfecting device.

Other objects of the present invention not at this time more particularly enumerated will be clearly understood from the following detailed description of the present invention.

With these various objects of the present invention in view, the same consists in the novel construction of disinfecting device for poultry perches, and the like, hereinafter set forth; and, furthermore, this invention consists in the novel arrangements and combinations of the various parts, as well as in the details of the construction thereof, all of which will be hereinafter more fully described and then finally embodied in the clauses of the claim which are appended to and which form an essential part of this specification.

The invention is clearly illustrated in the accompanying drawings, in which:—

Figure 1:
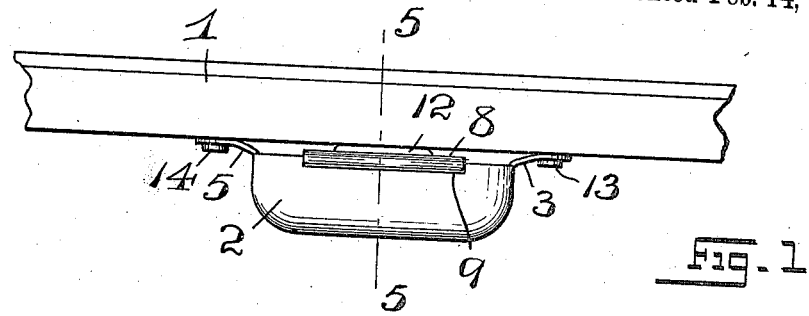
Figure 2:
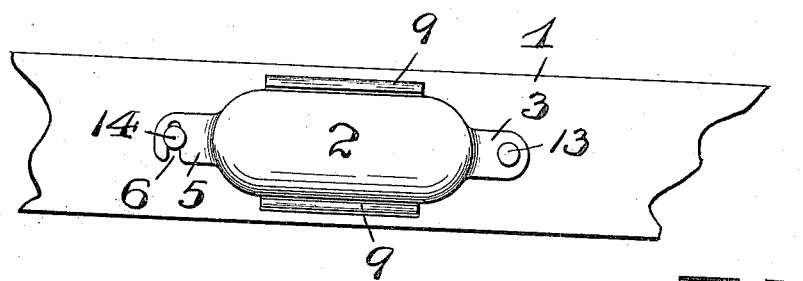
Figure 3:
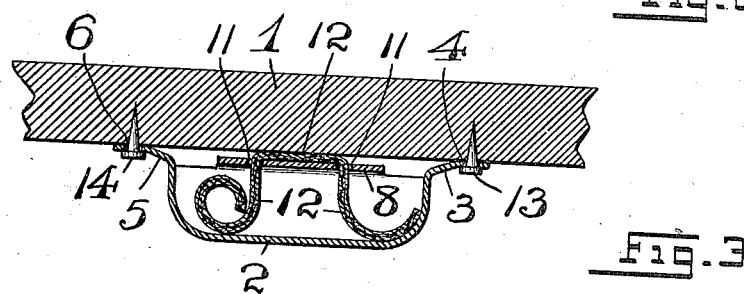
Figure 5:
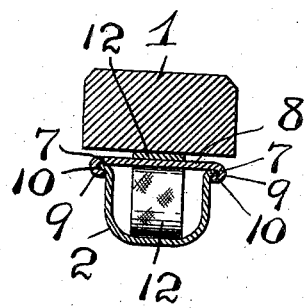
Figure 4:
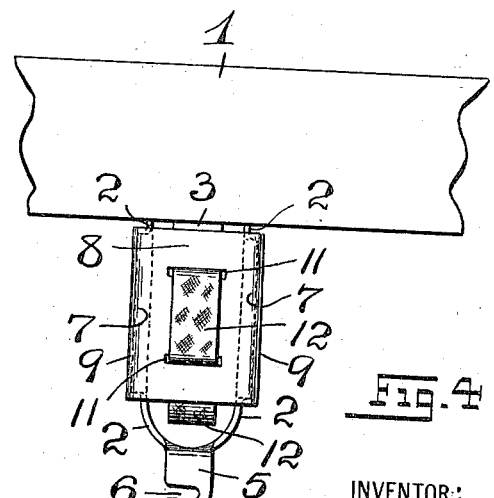

Figure 1 is a side elevation of a portion of a poultry perch equipped with the novel construction of disinfecting device embodying the principles of the present invention; Fig. 2 is a bottom view of the same; and Fig. 3 is a longitudinal vertical section of the same. Fig. 4 is a top view of a portion of a poultry perch, illustrating the manner in which the said novel disinfecting device may be manipulated to present the same for filling and refilling the reservoir thereof with a disinfecting fluid; and Fig. 5 is a vertical cross-section of said perch and said novel disinfecting device connected therewith, said section being taken on line 5—5 in said Fig. 1.

Similar characters of reference are employed in all of the hereinabove described views to indicate corresponding parts.

Referring now to the several figures of the drawings, the reference-character 1 indicates a poultry perch, the same being constructed in the usual manner of wood, or some similar fibrous or porous material.

The novel disinfecting device embodying the principles of the present invention comprises, preferably, an elongated cup-shaped body-portion 2 providing a reservoir adapted to contain and hold a disinfecting liquid, such, for example, as coal-oil or kerosene, or any other suitable disinfecting substance. Extending outwardly from one of the end peripheral edges of said body-portion 2 is a tongue or lug 3 provided with a suitable perforation 4. In like manner, the opposite end peripheral edge of said body-portion 2 is also provided with a tongue or lug 5 having an inwardly projecting slotted opening 6 extending from one of its lateral edges. The said body-portion 2 is further provided at its side peripheral edges with outwardly extending lateral projections 7, the same extending, preferably, at right angles to the side walls of said body-portion 2. Slidably and removably connected with said body-portion 2 is a carrier-plate 8, the lateral marginal edges 9 of which are turned, so as to form receiving grooves 10 which are adapted to receive the said lateral projections 7 of the main body-portion 2, whereby the said carrier-plate 8 is operatively connected with said main body-portion 2. The said carrier-plate 8 extends laterally across the opening or mouth of the reservoir which as has been stated, is formed by said body-portion 2, and the plate 8 is provided with a pair of suitably disposed and laterally extending slots or openings, as 11. The said carrier-plate 8 provides a means for carrying a wick 12, one end of said wick 12 being inserted through one of said slots or openings 11, then carried across the upper face of said carrier-plate 8, and thence passing downwardly through the other slot or opening 11 into the said above mentioned reservoir. The said wick 12, as thus arranged, has its two ends depending from said carrier-plate 8 into the interior of said reservoir, so as to absorb the disinfectant, while a portion of said wick is exposed upon or carried flatly by the said carrier-plate 8. The said disinfecting device constructed, as above described, is secured to the under side of said poultry-perch 1, by inserting through the perforation 4 of said tongue or lug 3 a suitable securing means 13, such as a nail, screw, or the like, the same being arranged so as to form a pivot upon which the said body-portion 2 may be swung into a position shown in said Fig. 4 of the drawings. A similar fastening means 14 is arranged upon the under side of said poultry perch 1, so as to receive the slotted opening 6 of said tongue or lug 5, when said body-portion 2 is swung into its operative position beneath the poultry perch 1.

As shown more particularly in Figs. 1, 3 and 5 of the drawings, the carrier-plate 8 lies in a plane above the plane of the marginal edge-portions of the body 2, with the wick 12 resting directly upon the upper surface of the plate 8, and normally, before the device is secured to the perch, slightly above the plane of the lugs 3 and 5, so that the said spring-like lugs, when the disinfectant device is turned and secured against the face of the perch, will serve as a means for firmly pressing and securing the wick in contact with the face of the perch, so that the absorption of the disinfectant liquid by the wick is conveyed directly against the face of the perch, and then readily taken up by the perch, the pores of which soon become filled and saturate the perch throughout its entire length with the disinfectant.

When it is desired to fill the said reservoir, formed by said body-portion 2, with a disinfecting fluid, the said body-portion is swung outwardly upon said pivotal securing means 13, so as to give access to the interior of said reservoir, as will be clearly understood from an inspection of said Fig. 4 of the accompanying drawings. After the said reservoir has been supplied with a suitable disinfecting fluid, and the wick 12 and its carrier-plate 8 have been properly adjusted in their relation to said body-portion 2, the latter is swung beneath the poultry-perch 1 and secured in its operative position by the tongue or lug 5 and its slotted opening 6 engaging the fastening means 14. When thus arranged beneath the perch that portion of said wick 12 which is exposed upon the upper surface of the carrier-plate 8 is consequently pressed against and in close contact with the under side of said poultry-perch 1. The capillary function of the said wick 12 now conveys the disinfecting liquid or fluid to said poultry-perch 1, and continuously supplies the same until said poultry-perch is thoroughly saturated with the disinfecting substance or fluid, the porous character of the said poultry-perch quickly taking up and absorbing throughout its mass the said disinfectant. In this manner, the said perch is rendered vermin-proof, sanitary and healthful, so that the birds or fowls making use of the roost or perch will not become diseased or vermin-ridden.

It will thus be clearly understood, that my present invention provides a cheap, simple, effective and easily applied disinfecting device for poultry perches, and all similar uses, the same being constructed so that it can be easily and quickly applied to all of the usual styles of poultry-perches, without the necessity of boring or cutting the perch, or otherwise fitting the device to the perch.

I am aware that changes may be made in the various arrangements and combination of the several parts without departing from the scope of my present invention. Hence, I do not limit my present invention to the exact arrangements and combinations of the parts as herein described and as illustrated in the accompanying drawings, nor do I confine myself to the exact details of the construction of the said parts.

I claim:—

1. A disinfecting device for poultry perches comprising an open body forming a reservoir for the reception of a disinfectant, means for pivotally securing said body to the perch, means slidably and removably connected within said body for carrying a wick, said wick-carrying means and the wick projecting above the plane of the marginal edge-portions surrounding the opening of said body, and means for securing said pivoted body in its fixed position against a face of the perch, said means at the same time serving to press the wick firmly against the face of the perch, substantially as and for the purposes set forth.

2. A disinfecting device for poultry-perches, comprising an open body-portion providing a disinfectant reservoir, outwardly extending tongues connected with the respective end peripheral edges of said body-portion, one of said tongues forming in connection with suitable fastening means a pivotal connection between said body-portion and said perch, and the other of said tongues forming in connection with suitable fastening means a latch-portion for retaining said body-portion in its operative relation to said perch, and means connected with said body-portion for carrying a wick, said wick-carrying means and the wick projecting above the plane of the marginal edge-portions surrounding the opening of said body for firmly pressing a portion of said wick directly against said perch when said body-portion is fastened by means of said latch-portion to said perch.

3. A disinfecting device for poultry perches, comprising an open body-portion providing a disinfectant reservoir, outwardly extending tongues connected with the respective end peripheral edges of said body-portion, one of said tongues forming in connection with suitable fastening means a pivotal connection between said body-portion and said perch, and the other of said tongues forming in connection with suitable fastening means a latch-portion for retaining said body-portion in its operative relation to said perch, a carrier-plate, and a wick carried by said carrier-plate said carrier-plate and the wick projecting above the plane of the marginal edge-portions surrounding the opening of said body portion for firmly pressing a portion of the wick directly against said perch, when said body-portion is fastened by means of said latch-plate to the perch, substantially as and for the purposes set forth.

4. A disinfecting device for poultry perches, comprising an open body-portion providing a disinfectant reservoir, outwardly extending tongues connected with the respective end-peripheral edges of said body-portion, one of said tongues forming in connection with suitable fastening means a pivotal connection between said body-portion and said perch, and the other of said tongues forming in connection with suitable fastening means a latch-portion for retaining said body-portion in its operative relation to said perch, outwardly extending lateral projections connected with said body-portion, a carrier-plate slidably arranged upon said lateral projections, and a wick carried by said carrier-plate, said carrier-plate and the wick projecting above the plane of the marginal edge-portions surrounding the opening of said body-portion for firmly pressing a portion of the wick directly against said perch, when said body-portion is fastened by means of said latch-plate to the perch, substantially as and for the purposes set forth.

5. A disinfecting device for poultry-perches, comprising a body-portion providing a disinfectant reservoir, outwardly extending tongues connected with the respective end-peripheral edges of said body-portion, one of said tongues forming in connection with suitable fastening means a pivotal connection between said body-portion and said perch, and the other of said tongues forming in connection with suitable fastening means a latch-portion for retaining said body-portion in its operative relation to said perch, outwardly extending lateral projections connected with said body-portion, a carrier-plate slidably arranged upon said lateral projections, said carrier-plate having turned under portions at its lateral edges adapted to form receiving grooves for said lateral projections of said body-portion, and a wick, said carrier-plate being further provided with slots or openings through which said wick may be inserted to present a portion of said wick-body upon the upper surface of said carrier-plate, while the remaining portion of said wick depends within said reservoir, substantially as and for the purposes set forth.

6. A disinfecting device for poultry-perches, comprising a body-portion providing a disinfectant reservoir, means for pivotally securing said body-portion to the under side of a poultry-perch, or the like, laterally extending projections connected with the side peripheral edges of said body-portion, a carrier-plate having its lateral edges turned under to form receiving grooves whereby said carrier plate may be slidably and removably arranged upon said laterally extending projections connected with said body-portion, and a wick carried by said carrier-plate, substantially as and for the purposes set forth.

7. A disinfecting device for poultry-perches, comprising a body-portion providing a disinfectant reservoir, means for pivotally securing said body-portion to the under side of a poultry-perch, or the like, laterally extending projections connected with the side peripheral edges of said body-portion, a carrier-plate having its lateral edges turned under to form receiving grooves whereby said carrier-plate may be slidably and removably arranged upon said laterally extending projections connected with said body-portion, and a wick, said carrier-plate being further provided with slots or openings through which said wick may be inserted to present a portion of its body upon the upper surface of said carrier-plate while the remaining portion of said wick depends within said reservoir, substantially as and for the purposes set forth.

In testimony that I claim the invention set forth above I have hereunto set my hand this 12th day of April, 1910.

FRANK SHAY.

Witnesses:
    FREDK. C. FRAENTZEL,
    FREDK. H. W. FRAENTZEL.